US012723159B2

(12) United States Patent
Lee et al.

(10) Patent No.: US 12,723,159 B2
(45) Date of Patent: Sep. 1, 2026

(54) HYDROGEL COATING COMPOSITION FOR CHEMICAL SENSOR AND CHEMICAL SENSOR FABRICATED USING SAME

(71) Applicant: Kookmin University Industry Academy Cooperation Foundation, Seoul (KR)

(72) Inventors: Hyunjung Lee, Seoul (KR); Mi Rim Ham, Wonju-si (KR); Hyunji Kim, Incheon (KR); Soohyun Kim, Incheon (KR)

(73) Assignee: Kookmin University Industry Academy Cooperation Foundation, Seoul (KR)

( * ) Notice: Subject to any disclaimer, the term of this patent is extended or adjusted under 35 U.S.C. 154(b) by 772 days.

(21) Appl. No.: 18/016,545

(22) PCT Filed: Jun. 21, 2021

(86) PCT No.: PCT/KR2021/007767
§ 371 (c)(1),
(2) Date: Jan. 17, 2023

(87) PCT Pub. No.: WO2022/030754
PCT Pub. Date: Feb. 10, 2022

(65) Prior Publication Data
US 2023/0323132 A1 Oct. 12, 2023

(30) Foreign Application Priority Data
Aug. 7, 2020 (KR) ........................ 10-2020-0099187

(51) Int. Cl.
*C09D 4/00* (2006.01)
*B41M 3/00* (2006.01)
(Continued)

(52) U.S. Cl.
CPC ................. *C09D 4/00* (2013.01); *B41M 3/00* (2013.01); *B41M 5/0047* (2013.01); *C09B 62/00* (2013.01);
(Continued)

(58) Field of Classification Search
None
See application file for complete search history.

(56) References Cited

U.S. PATENT DOCUMENTS 6,113,856 A 9/2000 Lawrence et al.
9,314,520 B2 * 4/2016 Sung ....................... A61P 31/00
(Continued)

FOREIGN PATENT DOCUMENTS

JP 6033914 B2 11/2016
KR 10-1329895 B1 11/2013
(Continued)

OTHER PUBLICATIONS

English translation of KR 20190086281 A, Lee et al., 2019, p. 1-20. (Year: 2019).*
(Continued)

*Primary Examiner* — Lore R Jarrett
(74) *Attorney, Agent, or Firm* — Sughrue Mion, PLLC

(57) ABSTRACT

A hydrogel coating composition for a chemical sensor includes a photo-crosslinkable monomer containing a cationic functional group; a pH indicator dye; a viscosity modifier; and a solvent. The hydrogel coating composition for a chemical sensor can be used for identifying freshness of foods by detecting volatile basic nitrogen or toxic chemicals generated when food spoils, such as ammonia, hydrogen sulfide, etc., and can be coated in desired patterns on a substrate. A chemical sensor fabricated from the hydrogel coating composition is designed to fix a pH indicator dye through an ionic bond to prevent the detachment of the indicator dye. Therefore, the chemical sensor exhibits excellent color reproducibility and has stability as a sensor.

18 Claims, 6 Drawing Sheets

(51) Int. Cl.

| | |
|---|---|
| ***B41M 5/00*** | (2006.01) |
| ***C09B 62/00*** | (2006.01) |
| ***C09D 7/20*** | (2018.01) |
| ***C09D 7/41*** | (2018.01) |
| ***C09D 7/43*** | (2018.01) |
| ***C09D 7/65*** | (2018.01) |
| ***C09D 133/04*** | (2006.01) |
| ***G01N 21/80*** | (2006.01) |
| ***G01N 31/22*** | (2006.01) |

(52) U.S. Cl.
CPC ................. *C09D 7/20* (2018.01); *C09D 7/41* (2018.01); *C09D 7/43* (2018.01); *C09D 7/65* (2018.01); *C09D 133/04* (2013.01); *G01N 21/80* (2013.01); *G01N 31/223* (2013.01)

(56) References Cited

U.S. PATENT DOCUMENTS

2006/0134143 A1* 6/2006 Schneerson ............. A61P 37/04 424/246.1
2007/0237931 A1* 10/2007 Hsu ....................... B32B 27/065 428/204
2020/0319114 A1* 10/2020 Lee ...................... G01N 31/221

FOREIGN PATENT DOCUMENTS

KR 10-2019-0086281 A 7/2019
KR 10-2019-0112596 A 10/2019

OTHER PUBLICATIONS

Johanna Bünsow et al., "Polymer Brushes: Routes toward Mechanosensitive Surfaces", Accounts of Chemical Research, Mar. 2010, pp. 466-474, vol. 43, No. 3.
Kim, Hyunji et al., "Fabrication of Core/shell Type Hydrogel Bead for Bio-sensors", Abstracts of The Polymer Society of Korea, 2018, pp. 92 and 2PS-12, vol. 43, No. 2.
Md. Tariful Islam Mredha et al., "Double-Hydrophobic-Coating through Quenching for Hydrogels with Strong Resistance to Both Drying and Swelling", Advanced Science, Jan. 24, 2020, pp. 1-8, vol. 7, 1903145.
International Search Report for PCT/KR2021/007767, dated Nov. 12, 2021.

* cited by examiner

| PAN compared to MAETC (wt%) | 1 | 2 | 3 | 4 | 5 | 6 | 7 |
|---|---|---|---|---|---|---|---|
| Image |  |  |  |  |  |  |  |

| HEMA : Alginate (w/w) | 1 : 1 | 6 : 4 | 7 : 3 | 8 : 2 |
|---|---|---|---|---|
| Image |  |  |  |  |

HYDROGEL COATING COMPOSITION FOR CHEMICAL SENSOR AND CHEMICAL SENSOR FABRICATED USING SAME

CROSS REFERENCE TO RELATED APPLICATIONS

This application is a National Stage of International Application No. PCT/KR2021/007767 filed Jun. 21, 2021, claiming priority based on Korean Patent Application No. 10-2020-0099187 filed Aug. 7, 2020.

TECHNICAL FIELD

The present disclosure relates to a hydrogel coating composition for a chemical sensor and a chemical sensor fabricated using the same, and more particularly, to a hydrogel coating composition for a chemical sensor capable of being coated on a substrate to thereby be applicable to products in various forms, and a chemical sensor fabricated by curing after coating the hydrogel coating composition.

BACKGROUND ART

As the number of single-person households increases, the demand for convenience food such as delivery food is increasing. However, food is frequently discarded due to the lack of information on storage and spoilage of food without an expiration date. In addition, the lack of accurate indicators according to the freshness of food is causing sanitation problems.

To solve this problem, as a food sensor to check food safety, a portable electronic nose capable of detecting the freshness and spoilage of food by sensing an amount of volatile organic compounds has been developed. The portable electronic nose is portable, but has a problem in that measurement is cumbersome and cost-efficiency is low since it is required to provide a device for detection and smartphone equipment for monitoring.

As an alternative to the portable electronic nose, a color change sensor capable of identifying fermentation and spoilage states of foods by detecting harmful substances such as ammonia, hydrogen sulfide, acetic acid, carbon dioxide, and the like, generated during food fermentation has been developed. Since this color change sensor has low sensitivity characteristics, a method of accelerating the redox reaction of a gas using a redox compound such as ferrocene, or the like, has been developed in order to increase the sensitivity characteristics. However, the redox compound itself is harmful, so there is a limit to using the redox compound as a food sensor.

In recent years, as a method of determining whether food is spoiled or fermented, gas concentration measurement according to pH change of food is being used.

For example, FIGS. 1A and 1B show a film-type food spoilage detection sensor developed by a team of Fariba Dehghani and Rona Chandrawati at the University of Sydney, Australia. The sensor used a principle of changing color by ammonia occurred when food spoils, using a polymer that changes color on its own by gas without separately including a pH indicator dye. However, the film has a limitation in that it is difficult to achieve mass-production and popularization due to a complicated fabrication process, and only one substance is able to be detected.

In addition, U.S. Pat. No. 6,113,856 discloses a medical pH test device for confirming the generation of amine gas by color as shown in FIG. 2. The test device is usable in various combinations in that it uses a combination of a polymer and a dye, but has a limitation it that it is necessary to prepare and detect a liquid sample rather than a gas detection, and has a disadvantage in that the device is able to be used only with equipped device, and thus it is difficult to use from a public point of view.

Therefore, there is an increasing need for a sensing technology capable of immediately detecting a gas generated when food spoils, using a combination of various dyes, and providing easy product application and economic feasibility.

DISCLOSURE

Technical Problem

An object of the present disclosure is to provide a hydrogel coating composition for a chemical sensor that senses gas to generate color change.

Another object of the present disclosure is to provide a method for fabricating a hydrogel chemical sensor using the hydrogel coating composition for a chemical sensor.

Still another object of the present disclosure is to provide a hydrogel chemical sensor fabricated by using the hydrogel coating composition for a chemical sensor.

Technical Solution

In order to achieve the object, there is provided a hydrogel coating composition for a chemical sensor, comprising: a photo-crosslinkable monomer containing a cationic functional group; a pH indicator dye; a viscosity modifier; and a solvent.

The photo-crosslinkable monomer containing a cationic functional group may comprise an acrylic monomer containing an ammonium cation.

The photo-crosslinkable monomer containing a cationic functional group may comprise a monomer represented by the following Chemical Formula 1:

[Chemical Formula 1]

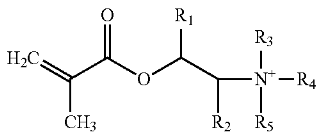

wherein, $R_1$ to $R_5$ are each independently a hydrogen atom, a substituted or unsubstituted C1 to C10 alkyl group, or a substituted or unsubstituted C6 to C20 aryl group.

In the Chemical Formula 1, it is preferable that $R_1$ and $R_2$ are hydrogen atoms, and $R_3$ to $R_5$ are C1 to C5 alkyl groups.

The hydrogel coating composition for a chemical sensor may further comprise: a second photo-crosslinkable monomer copolymerizable with the photo-crosslinkable monomer containing a cationic functional group.

The second photo-crosslinkable monomer may comprise a photo-crosslinkable acrylic monomer represented by the following Chemical Formula 2:

[Chemical Formula 2]

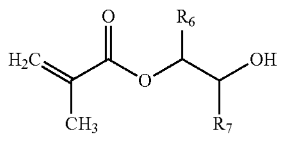

wherein, $R_6$ and $R_7$ may each independently be a hydrogen atom, a substituted or unsubstituted C1 to C10 alkyl group, or a substituted or unsubstituted C6 to C20 aryl group.

The pH indicator dye may be at least one selected from the group consisting of bromo phenol blue (BPB), bromochlorophenol blue (BCPB), bromo cresol green (BCG), bromocresol purple (BCP), bromothymol blue (BTB), phenol red, chlorophenol red, cresol red, methacresol purple (m-cresol purple: mCP), thymol blue, nitrazine yellow, brilliant yellow, acid blue 92, acid blue 29, acid alizarin violet N, alizarin complexone dihydrate, and alizarin red S monohydrate.

The viscosity modifier may be at least one organic polymer selected from the group consisting of polyacrylonitrile, polyacrylate, polyacrylamide, poly(anhydride), polyester, polyether, polyethersulfone, polyetherimide, polyethylene, polyethylene oxide, poly(ethyleneglycol), polyethylene terephthalate, polybutylene, polybutylene oxide, polyorthoester, polyurethane, polyimide, polycarbonate, polytetraethylene glycol diacrylate, polyphenylene oxide, polypropylene, polysulfone, polysiloxane, polyamide, polyviniyl alcohol, polyvinylacetate, polyvinylpyrrolidone, polyvinylidene fluoride, polyvinylidene chloride, polyvinylidene fluoride-hexafluoropropylene copolymer, cellulose acetate, cellulose nitrate, alginate, dextran, gelatin, collagen, chitosan, hyaluronic acid, zein, poly(lactic acid), poly(glycolic acid), poly(lactic-co-glycolic acid), and poly(ε-carprolactone).

The viscosity modifier may have an amount of 1 to 100 wt % based on the weight of the photo-crosslinkable monomer containing a cationic functional group.

The viscosity modifier may have an amount of 1 to 100 wt % based on the weight of the photo-crosslinkable monomer containing a cationic functional group and the second photo-crosslinkable monomer.

The solvent may be at least one organic solvent selected from the group consisting of dimethyl sulfoxide (DMSO), dimethylacetamide (DMAc), tetrahydrofuran (THF), 1-methyl-2-pyrrolidone (NMP), acetone, ethanol, n-propanol, n-butanol, n-hexane, cyclohexanol, acetic acid, ethyl acetate, diethyl ether, cyclohexane, benzene, toluene, and xylene; water; or a mixture thereof.

The hydrogel coating composition for a chemical sensor may further comprise: at least one photoinitiator selected from the group consisting of 2,2-dimethoxy-2-phenylacetophenone, 2-methoxy-2-phenylacetophenone, 2-hydroxy-1-[4-(2-hydroxyethoxy)phenyl]-2-methyl-1-propanone, an acetophenone derivative, and camphorquinone.

The hydrogel coating composition for a chemical sensor may further comprise: at least one photo-crosslinking agent selected from the group consisting of ethylene glycol dimethacrylate, 1,3-butanediol dimethacrylate, 1,3-butanediol diacrylate, 1,4-butanediol dimethacrylate, 1,4-butanediol diacrylate, 1,6-hexanediol diacrylate, pentaerythritol triacrylate, tetraethylene glycol dimethacrylate, divinyl benzene, trimethylolpropane triacrylate, isophorone diisocyanate, glycidyl methacrylate, and trimethylolpropane trimethacrylate.

In the hydrogel coating composition for a chemical sensor, the composition may have a viscosity of 500 to 2,000 cps.

In another aspect, there is provided a method for fabricating a hydrogel chemical sensor, comprising the steps of: coating a hydrogel coating composition for a chemical sensor on a substrate, the hydrogel coating composition for a chemical sensor comprising a photo-crosslinkable monomer containing a cationic functional group; a pH indicator dye; a viscosity modifier; and a solvent; and forming a hydrogel by irradiating the coating with light to crosslink the hydrogel coating composition.

The coating step may be performed by printing a predetermined pattern using an inkjet or 3D printer.

The pattern may be at least one of QR codes, barcodes, illustrations and letters.

In still another aspect, there is provided a hydrogel chemical sensor being fabricated by the method as described above, and sensing gas to generate color change.

The gas may be ammonia ($NH_3$), hydrogen sulfide ($H_2S$), hydrogen chloride, ethylene, trimethylamine, triethylamine, acetic acid, acetaldehyde, formaldehyde, dimethylacetamide, dimethylformamide, carbon dioxide, carbon disulfide, sulfur dioxide, acrylonitrile, hydrogen cyanide, vinyl chloride, or a mixture thereof.

The hydrogel chemical sensor of the present disclosure may further comprise: a hydrophobic coating layer on the surface.

Advantageous Effects

According to the present disclosure, there are provided a hydrogel coating composition for a chemical sensor capable of being used for identifying freshness of foods by detecting volatile basic nitrogen generating upon food putrefaction, or toxic chemicals of foods, such as ammonia, hydrogen sulfide, etc., and a chemical sensor fabricated therefrom.

The chemical sensor of the present disclosure is designed to fix a pH indicator dye through an ionic bond to prevent the detachment of the indicator dye and as such, exhibits excellent color reproducibility and has stability as a sensor. In addition, it is possible to fabricate a pH change detecting sensor optimized for objects to be detected and for uses thereof through a suitable combination of physical properties of a polymer material of hydrogel and the pH indicator dye, thereby selectively sensing only desired substances. Therefore, the chemical sensor of the present disclosure is able to be employed for a skin pH sensor, a hydrogel mask pack using the same, and the like.

In particular, since the hydrogel coating composition of the present disclosure is capable of being coated in desired patterns on a substrate, the composition is able to be provided as prints such as QR codes, barcodes, illustrations or letters for describing products, advertising diagrams or letters, and the like, on wrapping paper for foods, and the like, and as such, has excellent product applicability.

BEST MODE

Figure 1A:
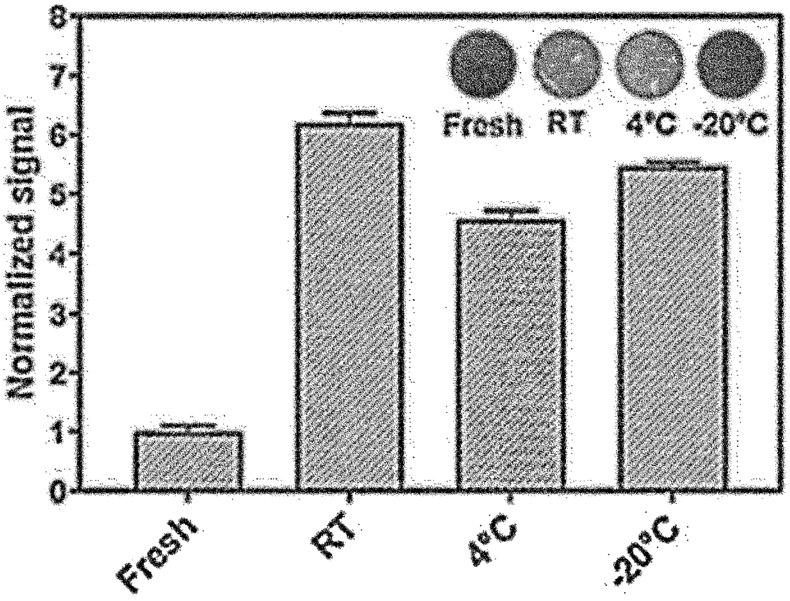
FIGS. 1A and 1B show a film-type food spoilage detection sensor according to the related art.
Figure 1B:
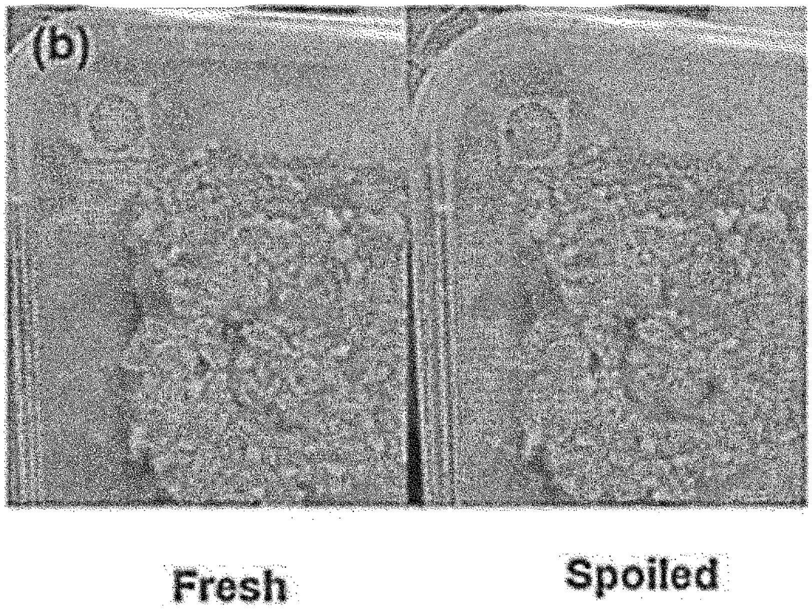
Figure 2:
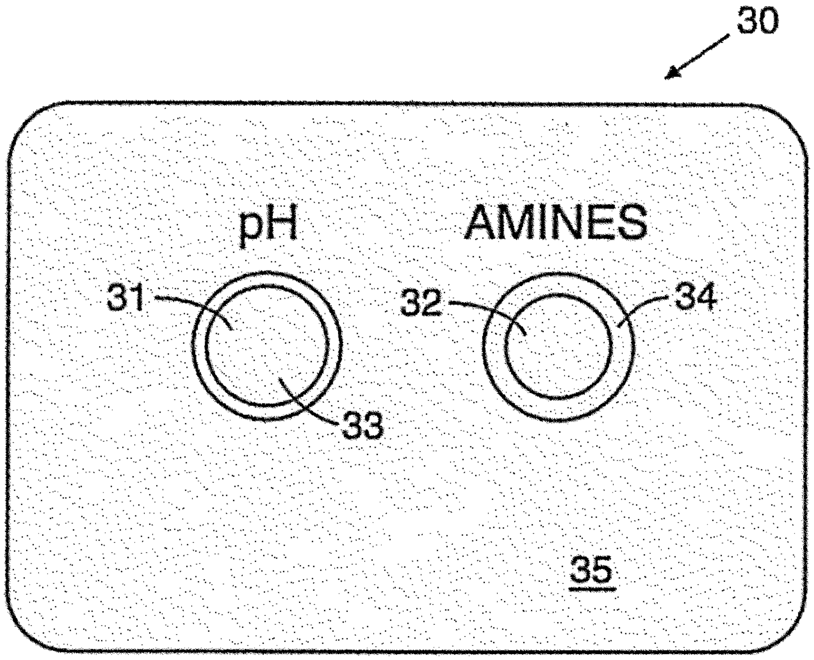
FIG. 2 shows a medical pH test device for confirming the generation of amine gas by color according to the related art.

Hereinafter, specific embodiment forms of the present disclosure will be described in more detail. Unless defined otherwise, all technical and scientific terms used herein have the same meaning as commonly understood by those skilled in the art to which the present disclosure pertains. In general, the nomenclature used herein is well known and commonly used in the art.

The present disclosure relates to a hydrogel coating composition for a chemical sensor, wherein the hydrogel coating composition of the present disclosure is capable of being coated on a substrate, and thus it is coated in various patterns that were difficult to implement in the existing bead type, thereby achieving excellent availability for wrapping paper for foods, and the like.

The hydrogel coating composition of the present disclosure comprises a photo-crosslinkable monomer containing a cationic functional group; a pH indicator dye; a viscosity modifier; and a solvent.

In the present disclosure, the term "hydrogel coating composition" means a coating composition for preparing a hydrogel, and specifically, refers to a coating composition capable of forming a hydrogel by being coated on a substrate and then cured by light irradiation.

Since the hydrogel coating composition of the present disclosure contains the pH indicator dye, when reacting with harmful gases such as ammonia, hydrogen sulfide, and the like, the pH changes, which generates a color change within a short time to thereby be able to easily detect harmful gases without the need for expensive equipment.

In the present disclosure, the photo-crosslinkable monomer containing a cationic functional group preferably includes an acrylic monomer containing a cationic functional group.

The term "acrylic monomer", as used herein, is used as a concept including an acrylic monomer and derivatives thereof.

In particular, the cationic functional group preferably includes an ammonium cation. The ammonium cation imparts a positive charge to the surface of the hydrogel coating structure to thereby form an ionic bond with the negatively charged pH indicator dye. Further, the solubility of the ammonium cation in water may vary depending on the number of chains and polarity of functional groups substituted with the ammonium salt.

In an exemplary embodiment of the present disclosure, the photo-crosslinkable monomer containing a cationic functional group may contain an acrylic monomer containing a quaternary ammonium radical cation.

For example, the photo-crosslinkable monomer containing a cationic functional group may include a monomer represented by the following Chemical Formula 1:

[Chemical Formula 1]

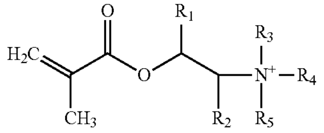

wherein, $R_1$ to $R_5$ may each independently be a hydrogen atom, a substituted or unsubstituted C1 to C10 alkyl group, or a substituted or unsubstituted C6 to C20 aryl group.

The term "substitution" of the alkyl or aryl group used in the Chemical Formula 1 means replacement with a halogen atom, a C1 to C10 alkyl group substituted with the halogen atom (for example, $CCF_3$, $CHCF_2$, $CH_2F$, $CCl_3$, and the like), a hydroxyl group, a nitro group, a cyano group, an amino group, an amidino group, hydrazine, hydrazone, a carboxyl group or a salt thereof, a sulfonic acid group or a salt thereof, a phosphoric acid or a salt thereof, or a C1 to C10 alkyl group, a C2 to C10 alkenyl group, a C2 to C10 alkynyl group, a C1 to C10 alkoxy group, a C1 to C20 heteroalkyl group, a C6 to C20 aryl group, a C6 to C20 arylalkyl group, a C6 to C20 heteroaryl group, or a C6 to C20 heteroarylalkyl group.

Specific examples of the C1 to C10 alkyl group used in the Chemical Formula 1 may include methyl, ethyl, propyl, isobutyl, sec-butyl, ter-butyl, neo-butyl, iso-amyl, hexyl, and the like, and one or more hydrogen atoms in the alkyl group may be substituted with a substituent as defined in the above-described "substitution".

The C6 to C20 aryl group used in the Chemical Formula 1 may be used alone or in combination, and means an aromatic system containing one or more rings. Examples thereof may include phenyl, naphthyl, tetrahydronaphthyl, and the like. In addition, one or more hydrogen atoms in the aryl group may be substituted with a substituent as defined in the above-described "substitution".

Specific examples of the C2-C10 alkenyl group used in the "substitution" may include vinylene, allylene, and the like.

Specific examples of the C2-C10 alkynyl group used in the "substitution" may include acetylene, and the like.

Specific examples of the C1-C10 alkoxy group used in the "substitution" may include methoxy, ethoxy, propoxy, and the like.

The C1 to C20 heteroalkyl group or arylalkyl group used in the "substitution" means that at least one of the carbon atoms constituting the alkyl group is replaced with a heteroatom such as N, O, S, or P or an aryl group such as phenyl, or the like.

The C6 to C20 heteroaryl group used in the "substitution" means an organic compound containing one or more heteroatoms selected from N, O, P or S, and the remaining ring atoms being carbon, and for example, may include pyridyl, and the like.

The C6 to C20 heteroarylalkyl group used in the "substitution" means that at least one of the carbon atoms constituting the alkyl group is replaced with the above-described heteroaryl group.

More preferably, in the Chemical Formula 1, $R_1$ to $R_5$ may each independently be a hydrogen atom or a substituted or unsubstituted C1 to C5 alkyl group.

Further, more preferably, in the Chemical Formula 1, $R_1$ and $R_2$ may be hydrogen atoms, and $R_3$ to $R_5$ may be C1 to C5 alkyl groups.

Further, most preferably, the photo-crosslinkable monomer containing a cationic functional group may include a compound in which in the Chemical Formula 1, $R_1$ and $R_2$ are hydrogen atoms and $R_3$ to $R_5$ are methyl groups.

In the present disclosure, the photo-crosslinkable monomer containing a cationic functional group preferably includes 2-methacryloyloxyethyl trimethylammonium chloride (MAETC).

In another preferred embodiment of the present disclosure, the hydrogel coating composition may further contain a second photo-crosslinkable monomer.

The second photo-crosslinkable monomer may be cross-linked with the photo-crosslinkable monomer containing a cationic functional group to form a copolymer.

The second photo-crosslinkable monomer may comprise an acrylic monomer.

For example, the photo-crosslinkable acrylic monomer may comprise a monomer represented by the following Chemical Formula 2:

[Chemical Formula 2]

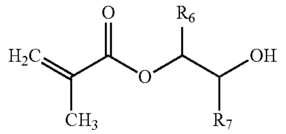

wherein, $R_6$ and $R_7$ may each independently be a hydrogen atom, a substituted or unsubstituted C1 to C10 alkyl group, or a substituted or unsubstituted C6 to C20 aryl group. In the Chemical Formula 2, "substitution" may be applied in the same manner as described in the Chemical Formula 1 above.

In a preferred embodiment of the present disclosure, in the Chemical Formula 2, $R_6$ and $R_7$ may each independently be a hydrogen atom or a substituted or unsubstituted C1 to C5 alkyl group.

Most preferably, in the Chemical Formula 2, both $R_6$ and $R_7$ may be hydrogen atoms.

For example, the photo-crosslinkable acrylic monomer may be 2-hydroxyethyl methacrylate (HEMA).

The second photo-crosslinkable monomer may be mixed with the photo-crosslinkable monomer containing a cationic functional group in an appropriate ratio within a range that does not impair the purposes of the present disclosure.

In the present disclosure, it is possible to provide a chemical sensor for color change having excellent durability in which the ionic bond between the positive charge of the photo-crosslinkable monomer containing a cationic functional group and the negative charge of the pH indicator dye firmly fixes the pH indicator dye so that the color of the indicator dye does not come out.

As the pH indicator dye usable in the present disclosure, a pH indicator dye having a negative charge is preferable, and for example, a pH indicator dye belonging to the negatively charged sulfate or sulfonate class may be used.

Specifically, the pH indicator dye of the present disclosure may be at least one dye selected from the group consisting of bromo phenol blue (BPB), bromochlorophenol blue (BCPB), bromo cresol green (BCG), chlorophenol red, bromocresol purple (BCP), bromothymol blue (BTB), phenol red, cresol red, methacresol purple (m-cresol purple: mCP), thymol blue, nitrazine yellow, brilliant yellow, acid blue 92, acid blue 29, acid alizarin violet N, alizarin complexone dihydrate, and alizarin red S monohydrate.

In the hydrogel coating composition of the present disclosure, the pH indicator dye may be contained at a concentration of 0.1 to 100 mM, preferably a concentration of 0.5 to 10 mM.

The hydrogel coating composition of the present disclosure may also comprise a viscosity modifier. The viscosity modifier allows the hydrogel coating composition to have a viscosity capable of maintaining a form thereof before being coated on a substrate and crosslinked by light irradiation.

The viscosity modifier may include at least one organic polymer selected from the group consisting of polyacrylonitrile, polyacrylate, polyacrylamide, poly(anhydride), polyester, polyether, polyethersulfone, polyetherimide, polyethylene, polyethylene oxide, poly(ethyleneglycol), polyethylene terephthalate, polybutylene, polybutylene oxide, polyorthoester, polyurethane, polyimide, polycarbonate, polytetraethylene glycol diacrylate, polyphenylene oxide, polypropylene, polysulfone, polysiloxane, polyamide, polyviniyl alcohol, polyvinylacetate, polyvinylpyrrolidone, polyvinylidene fluoride, polyvinylidene chloride, polyvinylidene fluoride-hexafluoropropylene copolymer, cellulose acetate, cellulose nitrate, alginate, dextran, gelatin, collagen, chitosan, hyaluronic acid, zein, poly(lactic acid), poly(glycolic acid), poly(lactic-co-glycolic acid), and poly (ε-carprolactone).

In consideration of the application use of the present disclosure, it is preferable to select polyacrylonitrile (PAN) as the viscosity modifier in order to selectively collect ammonia gas generated from food.

Alternatively, as the viscosity modifier, it is also preferable to use polyacrylonitrile together with biocompatible polymers such as gelatin, alginate, and the like.

The amount of the viscosity modifier may be appropriately adjusted depending on the type of the viscosity modifier, and preferably may include an amount required to obtain a viscosity suitable for the use of the hydrogel coating composition of the present disclosure. For example, the hydrogel coating composition of the present disclosure preferably has a viscosity of 500 to 2,000 cps, and the most preferably 1,000 to 1,500 cps.

For example, the viscosity modifier may have an amount of 1 to 100 wt % based on the weight of the photo-crosslinkable monomer. Here, the photo-crosslinkable monomer comprises the photo-crosslinkable monomer containing a cationic functional group and the second photo-crosslinkable monomer.

In a preferred exemplary embodiment of the present disclosure, the viscosity modifier may be mixed in an amount of more than 5 wt % and less than 10 wt % based on the weight of the photo-crosslinkable monomer. In an embodiment of the present disclosure, it was confirmed that when MAETC was used as the photo-crosslinking monomer containing a cationic photofunctional group, PAN was used as the viscosity modifier, and the PAN was contained in an amount of 5 wt % based on the weight of MAETC, the desired shape could not be maintained due to excessively low viscosity, and when the PAN was contained in an amount of 10 wt %, coating could not be achieved since aggregation occurred.

Alternatively, in another exemplary embodiment of the present disclosure, the viscosity modifier may be contained in an amount of 80 to 100 wt % based on the weight of the photo-crosslinkable monomer.

In the present disclosure, the solvent may be an organic solvent, water, or a mixture thereof.

The organic solvent is a solvent capable of dissolving the monomer or polymer, and may be used differently depending on the monomer or polymer to be used.

For example, the organic solvent is preferably at least one selected from the group consisting of dimethyl sulfoxide (DMSO), dimethylacetamide (DMAc), tetrahydrofuran (THF), 1-methyl-2-pyrrolidone (NMP), acetone, ethanol, n-propanol, n-butanol, n-hexane, cyclohexanol, acetic acid, ethyl acetate, diethyl ether, cyclohexane, benzene, toluene, and xylene.

In order to be used for a food sensor, the organic solvent is preferably a solvent harmless to the human body. For example, dimethyl sulfoxide (DMSO) may be used.

The solvent should be added within a range in which the viscosity of the coating composition is adequately maintained. For example, when the solvent is water, water may be added in an amount of 0.1 to 10 mol %, and preferably 0.5 to 2 mol %, based on the total monomers.

In addition, when the solvent is an organic solvent, the organic solvent may be appropriately added depending on the viscosity. For example, the organic solvent may be added in an amount of 50 to 200 wt %, preferably 70 to 150 wt %, based on the total weight of the monomer and polymer.

The hydrogel coating composition of the present disclosure may further comprise a photoinitiator. The photoinitiator may assist to initiate crosslinking by light irradiation after the hydrogel coating composition of the present disclosure is coated.

As the photoinitiator, a photoinitiator generally used in the art may be used. For example, the photoinitiator may be 2,2-dimethoxy-2-phenylacetophenone, 2-methoxy-2-phenylacetophenone, 2-hydroxy-1-[4-(2-hydroxyethoxy)phenyl]-2-methyl-1-propanone, an acetophenone derivative, camphorquinone, or a mixture thereof.

The hydrogel coating composition of the present disclosure may further comprise a photo-crosslinking agent.

The photo-crosslinking agent may be, for example, ethylene glycol dimethacrylate, 1,3-butanediol dimethacrylate, 1,3-butanediol diacrylate, 1,4-butanediol dimethacrylate, 1,4-butanediol diacrylate, 1,6-hexanediol diacrylate, pentaerythritol triacrylate, tetraethylene glycol dimethacrylate, divinyl benzene, trimethylolpropane triacrylate, isophorone diisocyanate, glycidyl methacrylate, trimethylolpropane trimethacrylate, or a mixture thereof.

The photoinitiator and the photo-crosslinking agent may be added in an amount of 0.1 to 5 mol %, preferably 0.5 to 2 mol %, respectively, based on the total monomers.

The hydrogel coating composition for a chemical sensor of the present disclosure may be coated on a substrate and then crosslinked by light irradiation using a known method to thereby form a hydrogel coating for a chemical sensor.

In particular, the hydrogel coating composition of the present disclosure may be applied as a food sensor through a simple method of coating with desired patterns, letters, pictures, and the like, on wrapping paper for foods using known printing equipment, followed by crosslinking through light irradiation. For example, the hydrogel coating composition of the present disclosure may be applied in various patterns such as QR codes, barcodes, illustrations or letters for describing products, advertising diagrams or letters, and the like, on gas-permeable paper or transparent wrapping paper used for food packaging, using printing machines such as inkjet printers, 3D printers, and the like. In addition, the hydrogel coating composition may be prepared as a mask pack using hydrogel, or the like, and thus, may be provided as a mask pack capable of sensing the pH change of the skin.

The light irradiation may preferably be ultraviolet (UV) irradiation. When the hydrogel coating composition is coated and then irradiated with light, crosslinking is performed through radical formation of the photoinitiator and polymerization of carbon double bonds ($=CH_2$) of methacrylate of each monomer containing a cross-linking agent.

Figure 3:
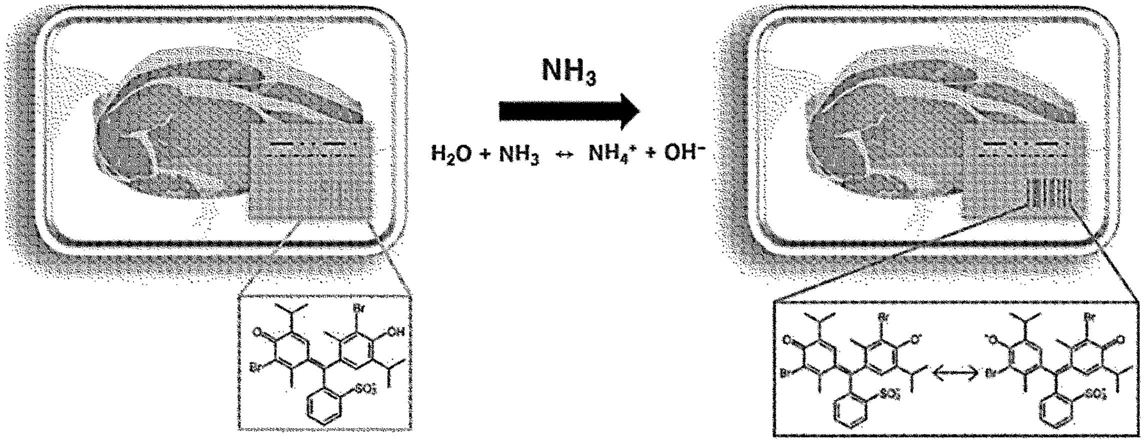
FIG. 3 is a schematic diagram showing a color change of the wrapping paper for foods to which the hydrogel chemical sensor according to an embodiment of the present disclosure is applied.

FIG. 3 is a schematic diagram showing that the food sensor, which is fabricated by coating the hydrogel coating composition for a chemical sensor according to an embodiment of the present disclosure in the form of a barcode on a wrapping paper, followed by crosslinking by light irradiation, is color changed by exposure to a gas generated upon food spoilage.

The gas capable of being detected by the chemical sensor of the present disclosure may be an acid gas or a basic gas. For example, the gas may be selected from ammonia ($NH_3$), hydrogen sulfide ($H_2S$), hydrogen chloride, ethylene, trimethylamine, triethylamine, acetic acid, acetaldehyde, formaldehyde, dimethylacetamide, dimethylformamide, carbon dioxide, carbon disulfide, sulfur dioxide, acrylonitrile, hydrogen cyanide, vinyl chloride, or a mixture thereof. For example, the gas may be ammonia ($NH_3$) gas.

Specifically, when the hydrogel chemical sensor is exposed to ammonia gas, the hydroxide ion ($OH^-$) on the right side is separated from the ammonia gas as shown in Reaction Scheme 1 below:

$$NH_3+H_2O \rightarrow NH_4^++OH^- \qquad \text{[Reaction Scheme 1]}$$

As shown above, if the diffused gas at 100 ppm or less is an acid gas, the pH indicator dye and $H^+$ ions may react, and if the diffused gas is a basic gas, the pH indicator dye and $OH^-$ ions may react, thereby exhibiting color change.

Even when the diffused gas is contained in a trace amount, for example, about 80 ppm or less, for example, 60 ppm or less, for example, 50 ppm or less, for example, 30 ppm or less, for example, 10 ppm or less, it is possible to react the $H^+$ ion or $OH^-$ ion of the gas with the pH indicator dye inside the hydrogel structure containing moisture within a few seconds to show the color change more clearly, thereby making it possible to easily sense the gas.

Unlike the existing hydrogels in which pH indicator dyes are physically inserted, the hydrogel sensor fabricated in the present disclosure is reusable and has high color reproducibility since the pH indicator dye is combined with the polymer through the ionic bond and is not easily desorbed. In addition, when fabricating the hydrogel sensor, the dye inserted inside is not limited to one, and thus it is possible to change the indicator dye according to the intended use. Therefore, it is possible to provide not only an accurate indicator for food, but also practical use for various purposes such as a skin pH sensor, a hydrogel mask pack using the same, and the like.

The hydrogel sensor fabricated in the present disclosure also may form a hydrophobic coating layer on the surface to prevent it from being affected by moisture and the external environment, and may retain the percentage of water content of the hydrogel itself to maintain performance as a sensor. For example, polydimethylsiloxane (PDMS) may be coated on the hydrogel coating of the present disclosure to maintain the performance. The PDMS has hydrophobicity and excellent elastic elongation due to the free rotation of the chain and the bond angle with the methyl group bonded to silicone. The PDMS coating may be prepared by coating the PDMS main agent and a curing agent in a ratio of 10:1 on the hydrogel sensor of the present disclosure, followed by curing.

The sensor developed in the present disclosure may be used in conjunction with an application by collecting the color expressed in the sensor and printing it in the form of a QR code, and thus the sensor may be widely applied not only to wrapping paper for foods, but also to various products that allow consumers to understand the freshness of food. Further, the chemical sensor of the present disclosure is able to be employed for a skin pH sensor, a hydrogel mask pack, and the like.

EXAMPLE

Hereinafter, the present disclosure will be described in more detail through Examples. These Examples are provided only to illustrate the present disclosure, and it will be apparent to those of ordinary skill in the art that the scope of the present disclosure should not be construed as being limited by these Examples.

Experimental Example 1: Fabrication of Letter-Shaped Hydrogel Sensor

A hydrogel coating solution was prepared by mixing 45.5 wt % of MAETC as a photo-crosslinkable monomer containing a cationic functional group, 2.85 wt % of polyacrylonitrile (PAN) as a viscosity modifier, 40.2 wt % of DMSO, and 11.4 wt % of deionized water.

To the solution, with respect to MAETC, 1 mol % of ethylene glycol dimethacrylate (EGDMA) was added as a photo-crosslinking agent, and 1 mol % of 2,2-dimethoxy-2-phenylacetophenone (DMPA) was also added as a photoinitiator. In addition, 1 mM concentration of bromothymol blue (BTB) as a pH indicator dye was dispersed in the solution.

In order to confirm the printability of the coating solution, the solution was put into a syringe and applied in the form of letters on the wrapping paper using a 24G needle.

Then, photopolymerization was performed by irradiating the coating solution with UV light (400 W, 50/60 Hz) to fabricate a hydrogel sensor.

Figure 4:
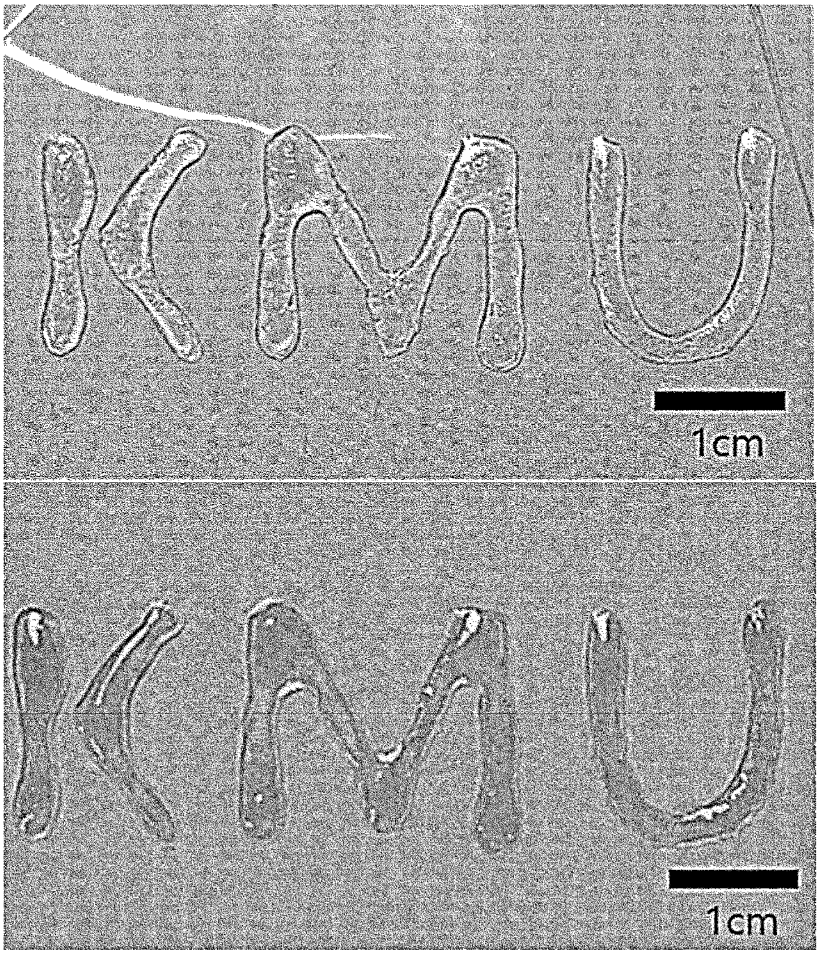
FIG. 4 shows images before and after the color change generated by applying ammonia gas to the hydrogel chemical sensor fabricated in an example of the present disclosure.

Images before and after the color change generated by applying ammonia gas to the fabricated hydrogel chemical sensor are shown in FIG. 4.

It could be confirmed from FIG. 4 that it was possible to fabricate the hydrogel sensor in the form of letters, and also confirmed with the naked eye that the color of the letters had changed clearly from bright yellow to green.

Experimental Example 2: Coating Performance Test Depending on Ratio of Viscosity Modifier A hydrogel coating solution was prepared with the same composition as in Example 1, except that the ratio of PAN to MAETC was changed to 1, 2, 3, 4, 5, 6, 7 and 10 wt %, and applied on a substrate in the form of letters.

Figure 5:
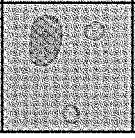
FIG. 5 is an image showing viscosities of coating solutions depending on the amount of polyacrylonitrile (PAN) in an example of the present disclosure.
Figure 5:
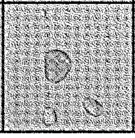
Figure 5:
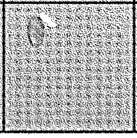
Figure 5:
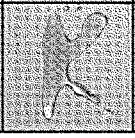
Figure 5:
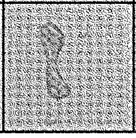
Figure 5:
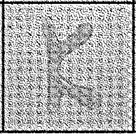
Figure 5:
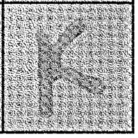

As shown in FIG. 5, when the ratio of PAN to MAETC was 1 to 5 wt %, it could be confirmed that the coating was not sufficient to produce the desired shape of letters due to the lack of viscosity.

It could be confirmed that when the ratio of PAN was 6 and 7 wt %, the coating was performed while the shape of letters was well maintained.

Figure 6:
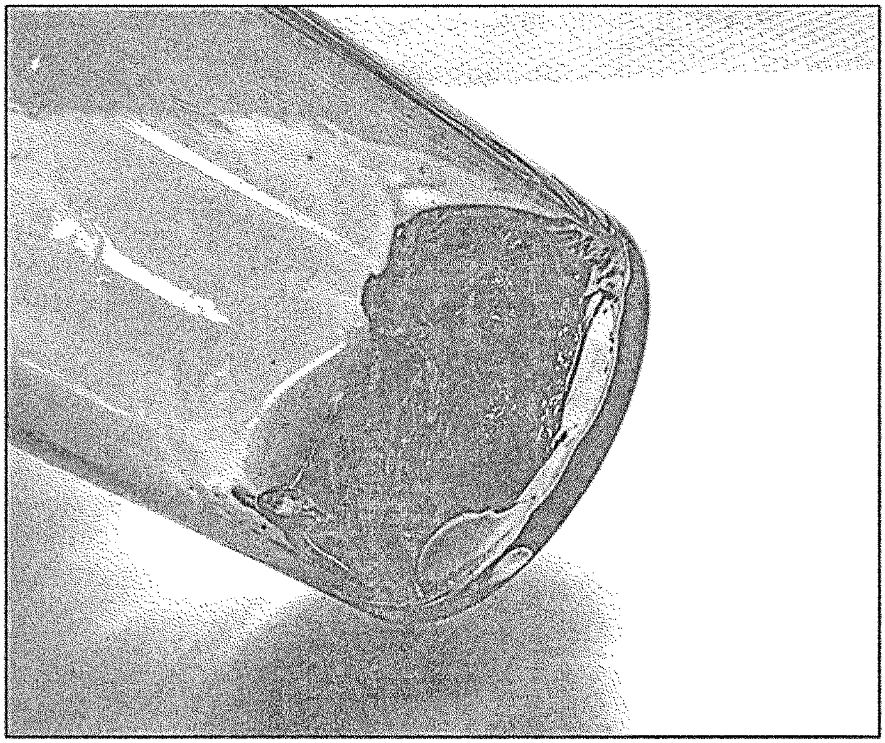
FIG. 6 is an image in which the solution is aggregated due to the excessive addition of polyacrylonitrile (PAN) in an example of the present disclosure.

Meanwhile, when the ratio of PAN was 10 wt %, as shown in FIG. 6, the coating was impossible due to aggregation.

Experimental Example 3: Fabrication of Hydrogel Sensor Using a Plurality Of Monomers MAETC, 2-hydroxyethyl methacrylate (HEMA) and alginate were mixed in a weight ratio of 1:1.55:2.4.

The mixture, ethylene glycol dimethacrylate (EGDMA) as a photo-crosslinking agent, 2,2-dimethoxy-2-phenylacetophenone (DMPA) as a photoinitiator, and water were mixed in a molar ratio of 100:1:1:1, respectively, to prepare a solution for hydrogel coating.

In addition, 1 mM concentration of bromothymol blue (BTB) as a pH indicator dye was dispersed in the solution.

In order to confirm the printability of the coating solution, the solution was put into a syringe and applied in the form of letters on the wrapping paper using a 24G needle.

Figure 7:
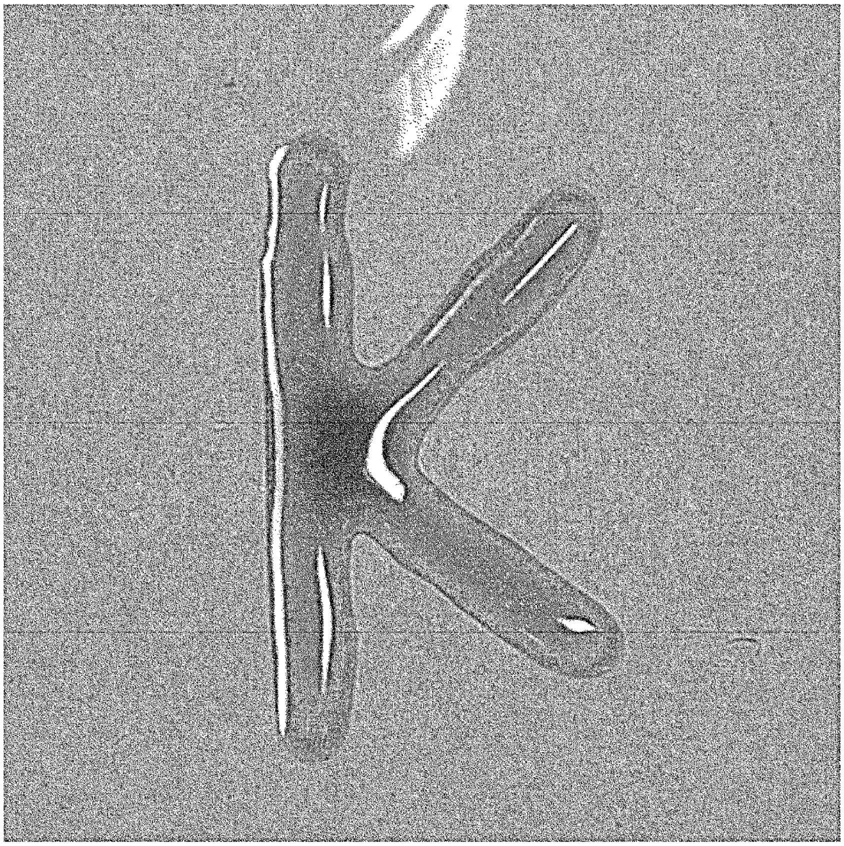
FIG. 7 is an image of a hydrogel chemical sensor fabricated using 2-methacryloyloxyethyl trimethylammonium chloride (MAETC), 2-hydroxyethyl methacrylate (HEMA), and alginate in an example of the present disclosure.

As shown in FIG. 7, it was confirmed that it was possible to form printing with well-maintained shape of letters.

Reference Example 1: Preparation of Hydrogel Coating Solution Using a Plurality of Monomers A coating composition was prepared by mixing 37.6 wt % of MAETC as a photo-crosslinkable monomer containing a cationic functional group, 47 wt % of 2-hydroxyethyl methacrylate (HEMA) as a viscosity modifier, and 15.4 wt % of deionized water.

To the solution, with respect to all monomers (MAETC and HEMA), 1 mol % of ethylene glycol dimethacrylate (EGDMA) was added as a photo-crosslinking agent, and 1 mol % of 2,2-dinethoxy-2-phenylacetophenone (DMPA) was also added as a photoinitiator. In addition, 1 mM concentration of bromothymol blue (BTB) as a pH indicator dye was dispersed in the solution.

In order to confirm the printability of the coating solution, the solution was put into a syringe and applied in the form of letters on the wrapping paper using a 24G needle.

Figure 8:
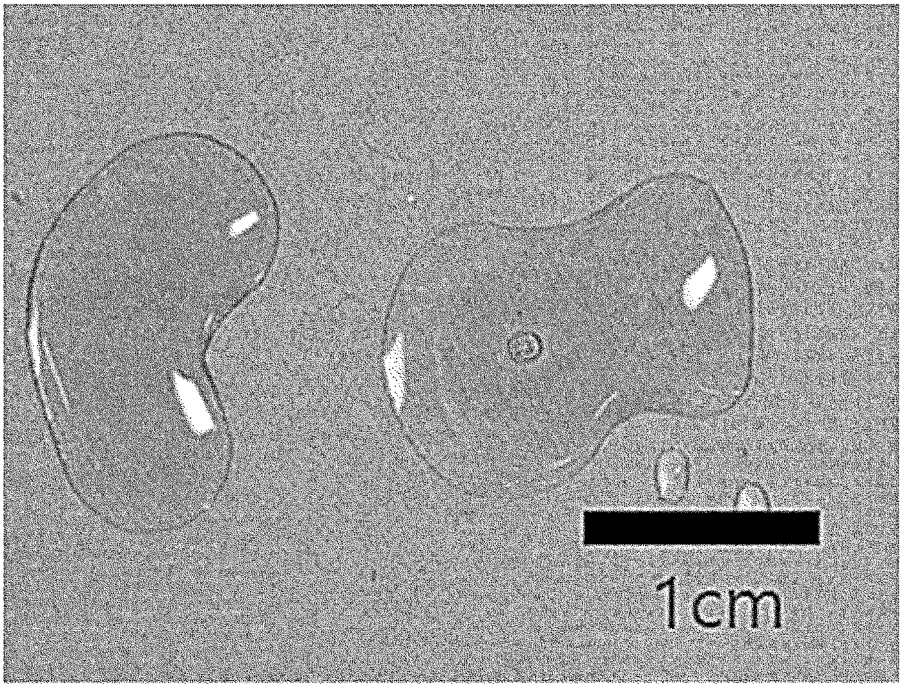
FIG. 8 is an image for confirming the viscosity of the hydrogel coating composition prepared in Reference Example of the present disclosure.
Figure 9:
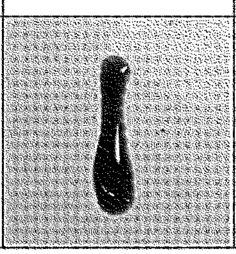
FIG. 9 is an image for confirming viscosities of the coating compositions depending on the ratio of HEMA and alginate in the Reference Example of the present disclosure.
Figure 9:
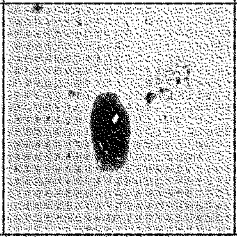
Figure 9:
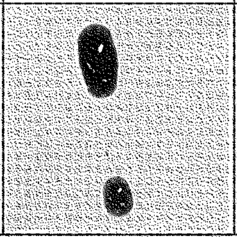
Figure 9:
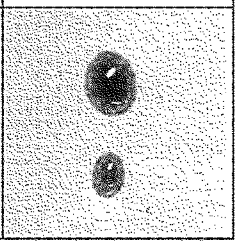

As shown in FIG. 8, it was confirmed that the shape of letters was not maintained since the viscosity of the coating solution was extremely low.

Reference Example 2: Preparation of Hydrogel Coating Solution without MAETC

2-Hydroxyethyl methacrylate (HEMA) as an acrylic monomer and alginate as a viscosity modifier were mixed in weight ratios of 1:1, 6:4, 7:3, and 8:2, respectively. Then, the mixture thus prepared, ethylene glycol dimethacrylate (EGDMA) as a photo-crosslinking agent, 2,2-dimethoxy-2-phenylacetophenone (DMPA) as a photoinitiator, and water were mixed in a molar ratio of 100:1:1:1, respectively, to prepare a coating solution.

In addition, 1 mM concentration of bromothymol blue as a pH indicator dye was dispersed in the solution.

In order to confirm the printability of the coating solution, the solution was put into a syringe and applied in the form of letters on the wrapping paper using a 24G needle.

As shown in FIG. 8, it was confirmed that it was impossible to print the patterns since the viscosity required for coating was not achieved regardless of the mixing ratios of the monomers.

From the above description, those skilled in the art to which the present disclosure pertains will understand that the present disclosure may be embodied in other specific forms without changing the technical spirit or essential characteristics thereof. In this regard, it should be understood that the embodiments described above are illustrative in all respects and not restrictive. As the scope of the present disclosure, it should be construed that all changes or modifications derived from the meaning and scope of the claims to be described below and equivalents thereof rather than the above detailed description are included in the scope of the present disclosure.

The invention claimed is:

1. A hydrogel coating composition for a chemical sensor, comprising:

a photo-crosslinkable monomer containing a cationic functional group;

a pH indicator dye;

a viscosity modifier; and a solvent, wherein the viscosity modifier is contained in an amount of more than 5 wt % and less than 10 wt % based on the weight of the photo-crosslinkable monomer containing a cationic functional group.

2. The hydrogel coating composition for a chemical sensor of claim 1, wherein the photo-crosslinkable monomer containing a cationic functional group comprises an acrylic monomer containing an ammonium cation.

3. The hydrogel coating composition for a chemical sensor of claim 1, wherein the photo-crosslinkable monomer containing a cationic functional group comprises a monomer represented by the following Chemical Formula 1:

[Chemical Formula 1]

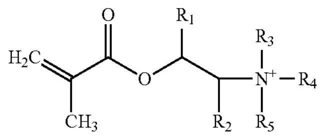

wherein, $R_1$ to $R_5$ are each independently a hydrogen atom, a substituted or unsubstituted C1 to C10 alkyl group, or a substituted or unsubstituted C6 to C20 aryl group.

4. The hydrogel coating composition for a chemical sensor of claim 3, wherein, in the Chemical Formula 1, $R_1$ and $R_2$ are hydrogen atoms, and $R_3$ to $R_5$ are C1 to C5 alkyl groups.

5. The hydrogel coating composition for a chemical sensor of claim 1, further comprising: a second photo-crosslinkable monomer copolymerizable with the photo-crosslinkable monomer containing a cationic functional group.

6. The hydrogel coating composition for a chemical sensor of claim 5, wherein the second photo-crosslinkable monomer comprises a photo-crosslinkable acrylic monomer represented by the following Chemical Formula 2:

[Chemical Formula 2]

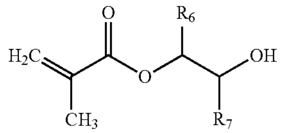

wherein, $R_6$ and $R_7$ are each independently a hydrogen atom, a substituted or unsubstituted C1 to C10 alkyl group, or a substituted or unsubstituted C6 to C20 aryl group.

7. The hydrogel coating composition for a chemical sensor of claim 1, wherein the pH indicator dye is at least one selected from the group consisting of bromo phenol blue (BPB), bromochlorophenol blue (BCPB), bromo cresol green (BCG), bromocresol purple (BCP), bromothymol blue (BTB), phenol red, chlorophenol red, cresol red, methacresol purple (m-cresol purple: mCP), thymol blue, nitrazine yellow, brilliant yellow, acid blue 92, acid blue 29, acid alizarin violet N, alizarin complexone dihydrate, and alizarin red S monohydrate.

8. The hydrogel coating composition for a chemical sensor of claim 1, wherein the viscosity modifier is at least one organic polymer selected from the group consisting of polyacrylonitrile, polyacrylate, polyacrylamide, poly(anhydride), polyester, polyether, polyethersulfone, polyetherimide, polyethylene, polyethylene oxide, poly(ethyleneglycol), polyethylene terephthalate, polybutylene, polybutylene oxide, polyorthoester, polyurethane, polyimide, polycarbonate, polytetraethylene glycol diacrylate, polyphenylene oxide, polypropylene, polysulfone, polysiloxane, polyamide, polyvinyl alcohol, polyvinylacetate, polyvinylpyrrolidone, polyvinylidene fluoride, polyvinylidene chloride, polyvinylidene fluoride-hexafluoropropylene copolymer, cellulose acetate, cellulose nitrate, alginate, dextran, gelatin, collagen, chitosan, hyaluronic acid, zein, poly(lactic acid), poly(glycolic acid), poly(lactic-co-glycolic acid), and poly (ε-carprolactone).

9. The hydrogel coating composition for a chemical sensor of claim 1, wherein the solvent is at least one organic solvent selected from the group consisting of dimethyl sulfoxide (DMSO), dimethylacetamide (DMAc), tetrahydrofuran (THF), 1-methyl-2-pyrrolidone (NMP), acetone, ethanol, n-propanol, n-butanol, n-hexane, cyclohexanol, acetic acid, ethyl acetate, diethyl ether, cyclohexane, benzene, toluene, and xylene; water; or a mixture thereof.

10. The hydrogel coating composition for a chemical sensor of claim 1, further comprising: at least one photoinitiator selected from the group consisting of 2,2-dimethoxy-2-phenylacetophenone, 2-methoxy-2-phenylacetophenone, 2-hydroxy-1-[4-(2-hydroxyethoxy)phenyl]-2-methyl-1-propanone, an acetophenone derivative, and camphorquinone.

11. The hydrogel coating composition for a chemical sensor of claim 1, further comprising: at least one photo-crosslinking agent selected from the group consisting of ethylene glycol dimethacrylate, 1,3-butanediol dimethacrylate, 1,3-butanediol diacrylate, 1,4-butanediol dimethacrylate, 1,4-butanediol diacrylate, 1,6-hexanediol diacrylate, pentaerythritol triacrylate, tetraethylene glycol dimethacrylate, divinyl benzene, trimethylolpropane triacrylate, isophorone diisocyanate, glycidyl methacrylate, and trimethylolpropane trimethacrylate.

12. The hydrogel coating composition for a chemical sensor of claim 1, wherein the composition has a viscosity of 500 to 2,000 cps.

13. A method for fabricating a hydrogel chemical sensor, comprising the steps of:

coating a hydrogel coating composition for a chemical sensor on a substrate, the hydrogel coating composition for a chemical sensor comprising a photo-crosslinkable monomer containing a cationic functional group; a pH indicator dye; a viscosity modifier; and a solvent; and forming a hydrogel by irradiating the coating with light to crosslink the hydrogel coating composition, wherein the viscosity modifier is contained in an amount of more than 5 wt % and less than 10 wt % based on the weight of the photo-crosslinkable monomer containing a cationic functional group.

14. The method for fabricating a hydrogel chemical sensor of claim 13, wherein the coating step is performed by printing a predetermined pattern using an inkjet or 3D printer.

15. The method for fabricating a hydrogel chemical sensor of claim 14, wherein the pattern is at least one of QR codes, barcodes, illustrations and letters.

16. A hydrogel chemical sensor being fabricated by the method of claim 13 and sensing gas to generate color change.

17. The hydrogel chemical sensor of claim 16, wherein the gas is ammonia, hydrogen sulfide, hydrogen chloride, ethylene, trimethylamine, triethylamine, acetic acid, acetaldehyde, formaldehyde, dimethylacetamide, dimethylformamide, carbon dioxide, carbon disulfide, sulfur dioxide, acrylonitrile, hydrogen cyanide, vinyl chloride or a mixture thereof.

18. The hydrogel chemical sensor of claim 16, further comprising: a hydrophobic coating layer on the surface.

* * * * *